United States Patent [19]

McWhorter

[11] Patent Number: 5,331,930
[45] Date of Patent: Jul. 26, 1994

[54] UNIVALVE ENGINE

[76] Inventor: Edward M. McWhorter, 6931 Greenbrook Cir., Citrus Heights, Calif. 95621

[21] Appl. No.: 42,695

[22] Filed: Apr. 5, 1993

[51] Int. Cl.$^5$ ............................................. F01L 1/28
[52] U.S. Cl. ................................. 123/79 R; 123/549; 60/321
[58] Field of Search .............. 123/41, 31, 79 R, 549, 123/554, 557; 60/321

[56] References Cited

U.S. PATENT DOCUMENTS

| | | | |
|---|---|---|---|
| 2,315,462 | 3/1943 | Till | 123/41.31 |
| 3,888,081 | 6/1975 | Fitts | 60/321 |
| 4,572,146 | 2/1986 | Grunwald et al. | 123/557 |
| 5,205,246 | 4/1993 | McWhorter | 123/79 R |

FOREIGN PATENT DOCUMENTS 2064657  6/1981  United Kingdom ............... 123/549

*Primary Examiner*—Noah P. Kamen

[57] ABSTRACT

The invention relates to new and useful improvements in those types of internal combustion engines which employ a single poppet valve to alternately control both the intake and exhaust flows through the same valve port. The exhaust and intake air interact within a common manifold wherein mixing is prevented by means of pneumatic elements comprising a nozzle and diffuser combination which direct the flow. The invention improves the separation of intake air and exhaust gases within the manifold of engines of this character by curving the flow axis of the diffuser such that its exit plane is more or less aligned with the logitudinal flow axis of the exhaust pipe. A means of throttling the engine by proportionally distributing the intake air within the said manifold between the airchest and exhaust gas circuits in a manner relative to the engine speed is a further improvement. The method of indirectly injecting fluid into the engine through the valve well is improved by moving the injection cup nearer to the combustion chamber and by contouring its inner surfaces in contact with the alternately bidirectional flow of the intake and exhaust streams such that the temperature of the evaporated injection fluid is higher.

9 Claims, 7 Drawing Sheets

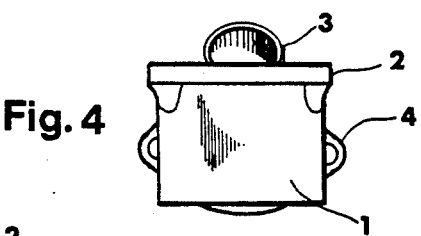
Fig. 4
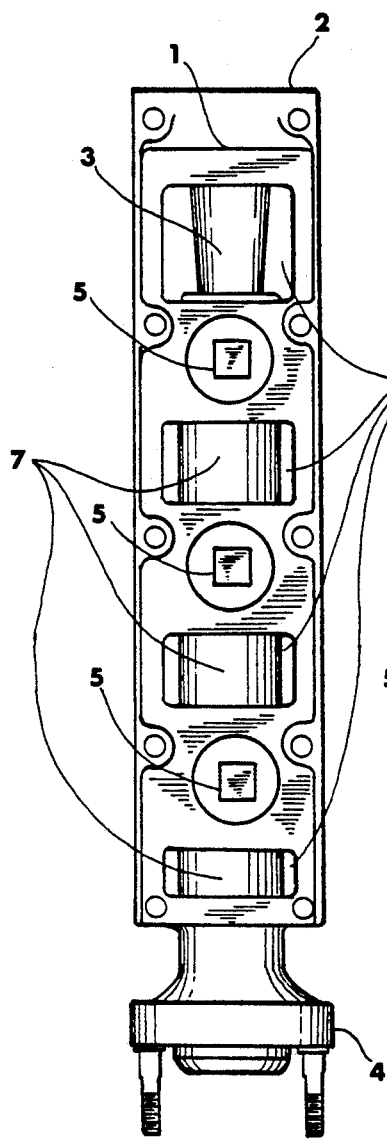
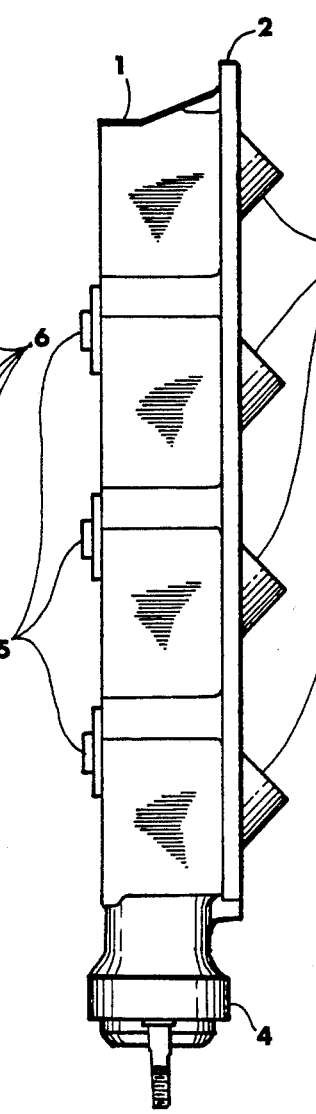
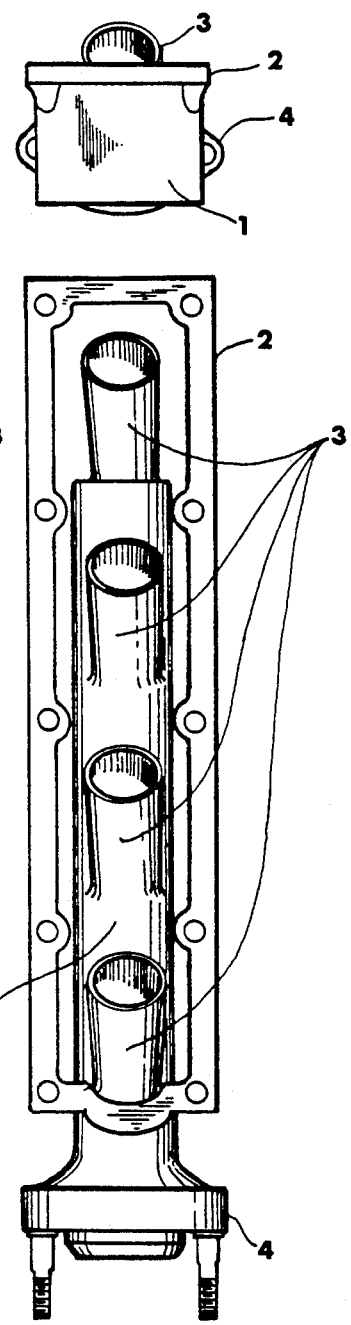
Fig. 2    Fig. 1    Fig. 3
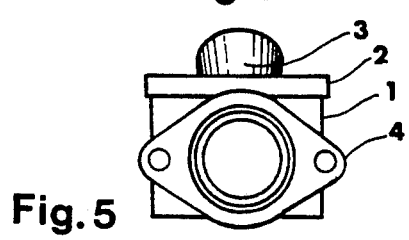
Fig. 5

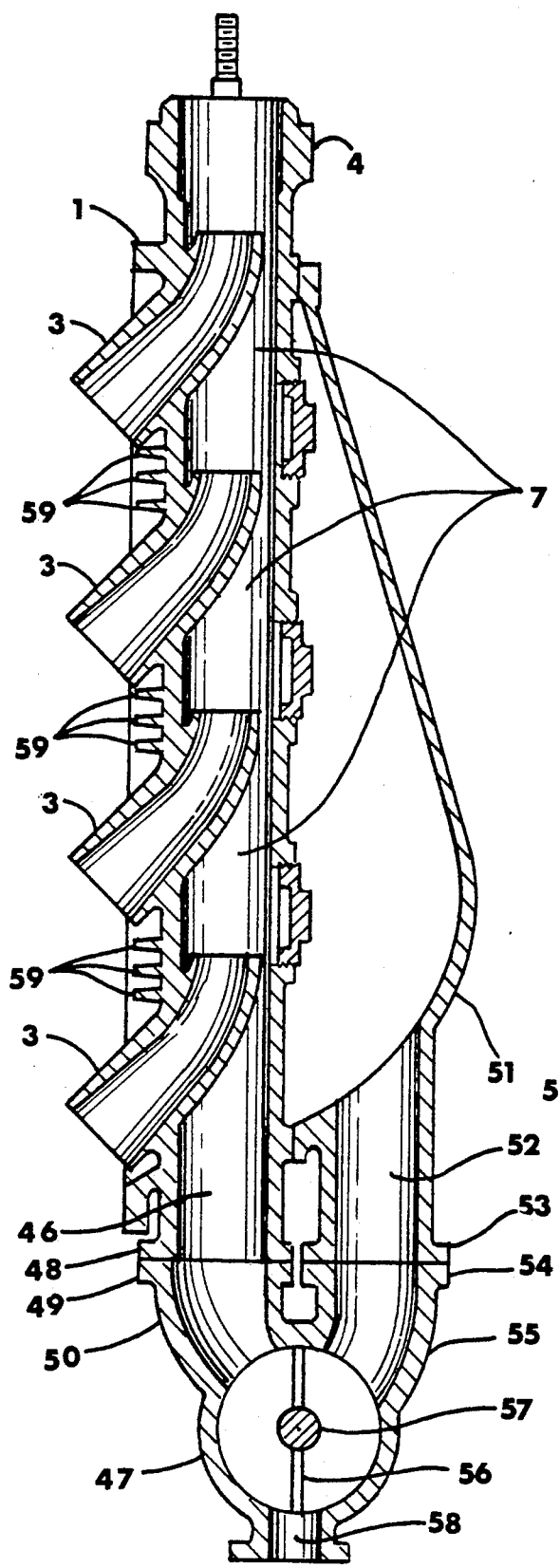
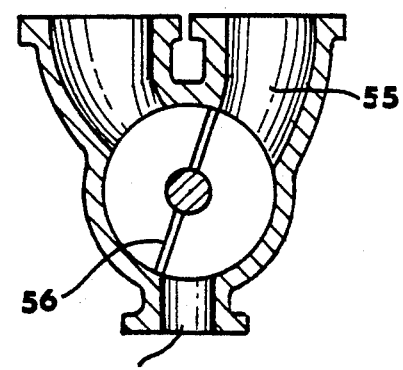
Fig. 21
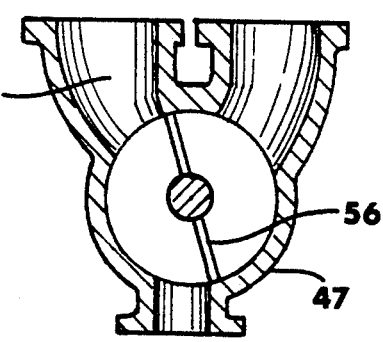
Fig. 20
Fig. 19

UNIVALVE ENGINE

CROSS REFERENCES

The present invention employs the basic design features of my earlier U.S. Pat. No. 5,191,858 and copending patent Ser. No. 943,555.

BACKGROUND OF THE INVENTION

1. Field of the Invention

The invention relates to valve components and manifolding controlling the air intake and combustion gas exhaust flows of internal combustion engines.

2. Description of Prior Art

In my earlier cross-referenced copending patent, the exhaust and intake lobes of the camshaft were combined to form a single broad lobe cam bearing upon a single popper valve controlling both the exhaust and intake flows through a common valve port. The advantage of such a system is that it permits a fully open valve duration equal to the degree of lobe separation which in todays high performance engine is about 110° or a corresponding 220° of engine crank rotation. The ability of this type of system to complete the exhaust stroke with the valve in the fully open position at the end of 55° degrees of camshaft rotation and to begin the induction stroke with the valve in the same fully open position for the remaining 55° of camshaft rotation greatly reduces the engine piston pumping work and improves the engine volumetric efficiency. In the present invention the efficiency of the separation of the exhaust and intake streams is improved by changing the configuration of the diffuser such that its flow axis is aligned with the flow axis of the exhaust pipe. This is somewhat similar to Birman's U.S. Pat. No. 2,406,656 in which he aligns diffusers in the exhaust pipe leading to a turbine. However, in this latter instance the flow is entirely within the exhaust circuit and is not in communication with the air induction circuit as in the present invention.

Another feature of the present invention is the addition of a resonance chamber which is positioned adjacent to the exhaust nozzle exit. The resonance chamber responds as a pressure reservoir damping the pulsations and fluctuations occurring in the intervening space between the exhaust nozzle exit and the diffuser inlet during the alternating exhaust and intake strokes of the engine piston. In the present invention no attempt is made to tune the air channel length leading to the resonance chamber as is the case of induction systems designed in accordance with the well understood Helmholtz relationship. The purpose of the resonance chamber in this instance is to limit the lag of flow reversal within the nozzle when the engine piston is at its top-dead-center position of crank rotation at the end of the exhaust stroke and is at the beginning downward stroke of the cycle, with the poppet valve held in the fully open position by the combined-lobe cam.

Another improvement of the present invention is in the fabrication of the injection cup in which the valve seat is formed as an integral part of a single component insert which is press-fit into the valve well in one operation during the engine assembly. By forming the valve seat with the injection cup the component becomes more cost effective in both its manufacture and in its assembly on the engine.

The function of the injection cup is improved by forming the inner cylinder passageway as a conical convergency such that its diffuser action is increased during the engines induction stroke. The outer cylinder passage way is formed as a conical divergency such that its nozzle action is also increased during the induction stroke. Used in the above context, a nozzle is defined as a divergent flow channel in which the fluid velocity is increased and its pressure is decreased. Similarly a diffuser is defined as a convergent flow channel in which the fluid velocity is decreased and its pressure is increased. Hereinafter the terms "nozzle action" and "diffuser action" will pertain to flow phenomena in the present invention by this definition. During the engines exhaust stroke the above flow processes are reversed such that the inner cylinder passageway now reacts as a nozzle and the outer passageway of the injection cup reacts as a diffuser.

By increasing the diffuser action of the injection cups inner passageway an alcohol water mixture or other mixtures injected into the cup are held slightly longer at higher pressures. The heat transferred to the water molecules of the mixture should be sufficiently high such that its quenching effect within the engines combustion chamber is diminished. This is seen as a regenerative process in which a portion of the waste heat of the exhaust gas is returned to the combustion chamber. Ignition of combustible stagnant gases at the heated surfaces of the cup occurs only if a sufficiently large concentration of reactant is present to generate a steady combustion wave. In the flowing system, the heat capacity of the cup and that of the water vapor within the laminar flow of the boundary at the surface or turbulent mixing zone of the inner passageway are considered, it can be seen that the necessary concentrations are not present and that the energy level required to ignite the mixture is too low to cause burning in the valve well. Therefore, combustion does not occur until the mixture is compressed with the air charge at the end of the engine pistons compression stroke at which time it is electrically spark ignited.

When the heat sink capability of the inner cylinder of the injection cup is not sufficiently large enough to maintain the evaporation process at a sufficiently high temperature to prevent excessive quenching during combustion, additional heat transfer to the inner cylinder is achieved by placing vertical fins on its outer surface to extract more heat from the exhaust gases flowing in the outer passageway.

When only indirect injection is used an electrical heater is placed in the fuel injection conduit of the injection cup as an optional feature to promote vaporization. The electrical heater circuit is automatically broken by a timing switch or thermal relay switch after the engine is started and the injection cup has been raised to its operating temperature. When both direct and indirect injection is employed in the engine design, electrical heating is not required.

In the Cross Referenced patents the engine exhaust manifold is located outside of the airchest. In the present invention the exhaust manifold is located inside the airchest. This is contrary to accepted practice where in most instances it is desirable to keep the temperature of the air-charge as low as possible in order to create m higher expansion of the working fluid after combustion. Because of the high volumetric efficiency of the univalve engine which is made possible by the combined-lobe cam, the convective heating of the air-charge by its passing over the heated surface of the exhaust manifold within the airchest is slight. The heated air does not exert as severe a cooling effect upon the steam vapor produced in the injection cup and therefore it is not as readily condensed and its relative quenching effect upon the combustion is diminished. The convective air cooling of the exhaust manifold causes the hot gases flowing in the manifold to contract such that the manifold pressure decreases and thus lowers the pressure at the diffuser exits steadying the flow through the diffuser. The cooling effect can be further increased by placing cooling fins around the exhaust manifold to increase the amount of heat transferred.

In one design of the present invention a water cooling jacket is placed around the exhaust manifold to cause the contraction of the hot gases within.

SUMMARY OF THE INVENTION

It is the objective of the present invention to improve the efficiency of engines of the character described in which the air intake and exhaust gas flows are controlled by a single valve.

A primary objective of the invention is to improve the engines exhaust system by curving the axis of its diffuser flow path such that the flow from its exit plane is in general alignment with the flow axis of the manifold exhaust pipe.

Another objective of the invention is to fabricate the poppet valve seat and injection cup as a single piece such that the manufacturing cost of the combined parts is reduced and its installation in the engine valve well can be accomplished in a single operation.

It is yet another objective of the invention to configure the injection cup inner passageway in a manner which improves its ability to more efficiently vaporize the injected water during the intake stroke of the engine piston, and in another instance to provide additional heat transfer surface to its inner cylinder by placing vertical fins on its outside surface which absorb and conduct heat to the inner cylinder from the exhaust gases flowing in the outer passageway during the exhaust stroke of the engine piston.

It is still another objective of the invention to provide a means of electrically heating the fuel injection conduit of the injection cup during the engine startup in order to facilitate the ignition.

And yet another purpose of the invention is to provide a means of heating the intake air charge passing through the injection cup by causing it to first flow over the heated surfaces of the exhaust manifold, and in another instance it is the purpose to provide additional heat transfer surface by placing cooling fins on the exhaust pipe to further increase the temperature of the air charge and thus maintain the vaporized water from the injection cup at a higher temperature prior to ignition.

Another purpose of the invention is to provide a water cooling jacket around the engines exhaust pipe in order to cool the hot gases within and cause them to contract and thus lower the pressure within the exhaust pipe and promote a higher flow rate through the diffusers.

All of the forgoing and still further objects and advantages of the invention will become apparent from the consideration of the drawings and ensuing detailed description.

BRIEF DESCRIPTION OF THE DRAWINGS

Drawings are presented as a part of the detailed description which show the novel features of the invention.

FIG. 1 shows the external features of one side of the combined intake and exhaust manifold and is identical to the external features of its opposite side and is presented as the top view relative to its installation upon the engine.

FIG. 2 is a side view of the combined intake and exhaust manifold showing the side from which the intake air enters the manifold.

FIG. 3 is the side view of the combined intake and exhaust manifold showing the interior features which interface with the engine.

FIG. 4 is the forward end view of the combined intake and exhaust manifold.

FIG. 5 is the aft end view of the combined intake and exhaust manifold which holds the exhaust flange.

FIG. 19 is a longitudinal cross-section of the combined intake and exhaust manifolding showing the method of throttling air to the engine.

FIG. 20 is a cross-section of the throttle body used to control intake air to the engine showing the butterfly gate in the slow engine speed position.

FIG. 21 is a cross-section of the throttle body used to control intake air to the engine showing the butterfly gate in the fast engine speed position.

DESCRIPTION OF THE PREFERRED EMBODIMENT

Figure 6:
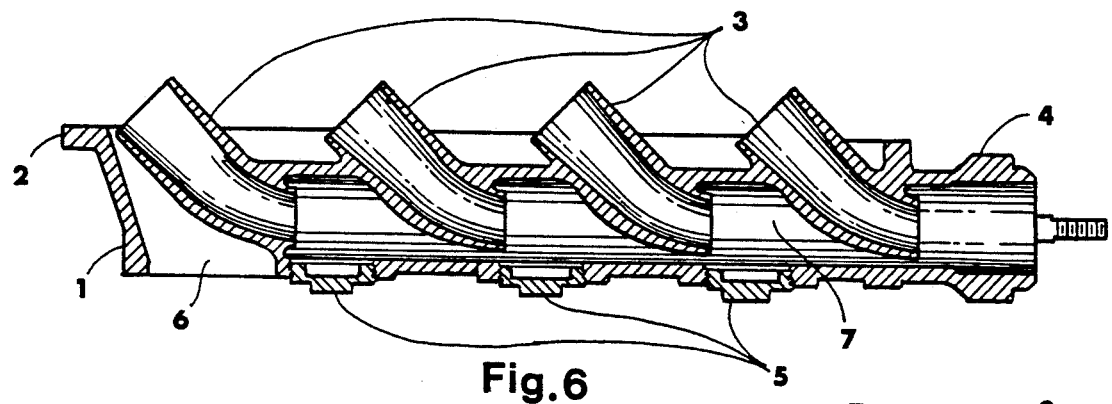
FIG. 6 is a cross-section of the combined intake and exhaust manifold taken longitudinally through the central axis of FIG. 3.

Referring now to the drawings and to FIG. 1 thereof in particular which is the top view of a manifold to be used in engines in which a single valve serves to control both the air intake and exhaust gas flows to and from the engine cylinder.

The manifold of FIG. 1 combines the air intake passages and exhaust gas circuit in a single housing called airchest 1, which bolts to the engine by flange 2. Shown in FIG. 1 are four diffusers 3, one for each of the corresponding valve port openings of a four cylinder engine.

FIG. 2 is a view of the air plenum side of the manifold of FIG. 1 showing four rectangular shaped air inlets 6 leading into airchest 1 in which intake air taken into the manifold flows over exhaust pipe 7 where its temperature is slightly raised. The conical shape of the diffuser 3 can be seen through the top air inlet 6. In this view the three plugs 5 can be seen as being circular with square wrenching surfaces for installing or removing them from threaded holes.

FIG. 3 is a view of the engine side of the manifold presented in FIG. 1 which shows the four conical shaped diffusers 3 and exhaust pipe 7 seen through the opening of flange 2 of airchest 1. Also shown in this view is exhaust flange 4.

FIGS. 4 and 5 are forward and aft end views respectively of the manifold of FIG. 1 showing the relative positions of airchest 1, flange 2, diffuser 3 and exhaust flange 4.

Turning now to FIG. 6 which is a longitudinal cross-section taken vertically through the manifold of FIG. 3. This figure shows the cross-sectional detail of airchest 1, flange 2, diffusers 3, exhaust flange 4 and plugs 5. In this view only the forward air inlet 6 is distinguishable of the four shown in FIG. 2 since the flow passages of the remaining three pass in front of the cross-section of exhaust pipe 7.

The novel features of the manifold design shown in FIG. 6 is the curvature of the conical axis of the diffusers 3 which permits the alignment of their exit planes along the longitudinal axis of the exhaust pipe 7 in a common direction of flow toward exhaust flange 4. In FIG. 6 it can be seen that the volume of airchest 1 and the inner volume of exhaust pipe 7 are both open to the ambient air and are in communication with each other through the open flow path through diffusers 3. Although it shares this facility of communication with the Cross Referenced patents the novelty of the alignment of the diffuser exit planes of the present invention greatly improves the ability of the system to separate the exhaust stream from the air stream and thus limit the amount of exhaust gas dilution during the induction stroke. This will be explained in greater detail in the discussion of FIGS. 15 and 16.

As shown in FIG. 6 the alignment of diffuser 3 exit planes in exhaust pipe 7 decreases the size of the manifold which in turn reduces the weight and spatial envelope of the engine in the engine compartment. When the combined intake and exhaust manifold is fabricated as a single casting plugs 5 are needed to cover the sand shake-out holes for the inner cores of the exhaust pipe 7. These holes also help to support the inner core during the casting process. Therefore it can be seen that plugs 5 are not intended to provide a useful function during the operation of the engine.

Figure 7:
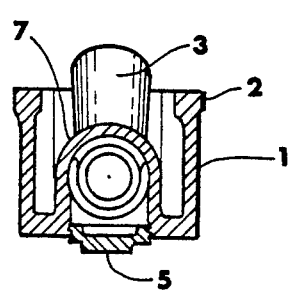
FIG. 7 shows a typical cross-section of the combined intake and exhaust manifold taken laterally through a plug.

Referring now to FIG. 7 which is a typical lateral cross-section of the manifold of FIG. 1 taken through plug 5 and looking toward the forward end of the assembly showing the relative positions of airchest 1, flange 2, nozzle 3 and exhaust pipe 7. In FIG. 7 the concentric alignment of diffuser 3 exit within exhaust pipe 7 is shown.

Figure 8:
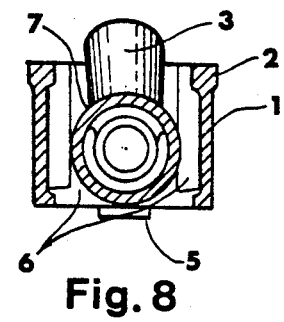
FIG. 8 shows a typical cross-section of the combined intake and exhaust manifold taken laterally through an air inlet.

FIG. 8 is a lateral cross-section of the manifold of FIG. 1 taken through an air inlet 6 and looking toward the forward end of the assembly showing the relative positions of airchest 1, flange 2, diffuser 3, plug 5, air inlets 6, and exhaust pipe 7. In FIG. 8 the concentric position of diffuser 3 exit aligned within exit pipe 7 is again shown.

Figure 9:
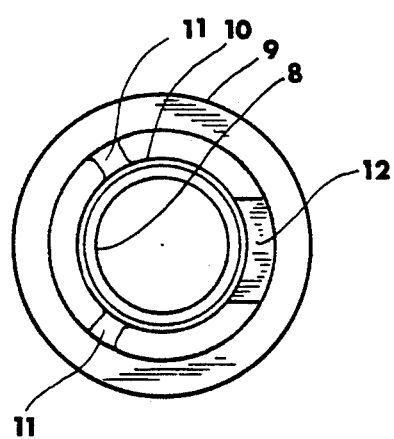
FIG. 9 is a top view of the fuel injection cup.

Referring now to FIG. 9 which is a top view of injection cup 8 used in the indirect injection of engines of the character previously described. Elements of the injection cup 8 are the outermost cylinder 9, innermost cylinder 10, webs 11, and thickened web 12 which is larger than webs 11. Injection cup 8 is most conveniently fabricated as a single integral piece either as a casting or as a sintered powder metal compact. Injection cup 8 is positioned in the engine valve well and forms two concentric flow channels around the valve stem, termed inner passage way and outer passage way.

The novel feature of the design of the injection cup of FIG. 9 is that the valve seat is formed at the bottom edge of the outer cylinder 9 and is part of the single component which is press fit into the valve well in one operation during the assembly of the engine.

Figure 10:
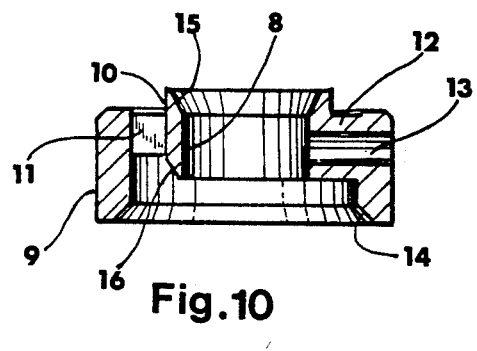
FIG. 10 is a vertical cross-sectional view of the fuel injection cup taken longitudinally through the central axis of the fuel injection conduit.

Referring now to FIG. 10 which is a cross-section of the injection cup of FIG. 9 cutting through the center of web 12. Fuel injection conduit 13 is shown passing through web 12. The bottom edge of outer cylinder 9 is countersunk forming valve seat 14. Other novel features of the injection cup 8 are the improvement of the diffuser action of the inner passage way and the improvement of the nozzle action of the outer passage way during the intake stroke of the engine piston. These improvements are accomplished by chamfering the upper innermost edge 15 of inner cylinder 10 to make the entrance of the inlet of inner passage way larger than its exit thereby forming a convergency to funnel the flow of the intake air and by chamfering the lower outermost edge 16 of inner cylinder 10 such that the exit area of the outer annular passageway formed between outer cylinder 9 and inner cylinder 10 is larger than its inlet thereby forming a divergency to the flow of intake air entering the engine combustion chamber. It can be seen that the chamfering of the upper and lower edges of inner cylinder 10 can be replaced by a molding process in which the inner cylinder 10 is formed as a cup-like curvature by precision casting or as a sintered powder metal compact. The curvature of the inner cylinder 10 forms a convergency of the inner passage way and at the same time forms a divergency in the outer passage way between the outer cylinder 9 and inner cylinder 10 thus promoting a diffuser action within the inner cylinder 10 and a nozzle action in the outer passage way during the intake stroke of the piston.

The injection cup of FIG. 9 is used in the engine design as an emission control device providing an indirect means of injecting water into the combustion chamber. The installation of an electrical heater requires a slight modification of injection cup 8 which is shown in FIGS. 11 through 14 and is now presented as injection cup 17.

Figure 11:
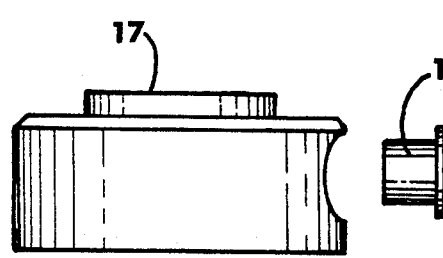
FIG. 11 is a side view of the injection cup in which the fuel injection conduit is electrically heated.
Figure 12:
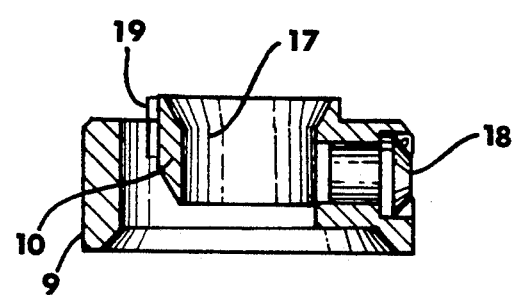
FIG. 12 is a cross-sectional view of the injection cup taken longitudinally through the central axis of the fuel injection conduit showing the electrical heater in place.

FIG. 11 is a side view of the electrically heated injection cup 17 in which the electrical heater tube 18 is shown outside the fuel injection conduit. FIG. 12 is a cross-section of the injection cup 17 showing electrical heater tube 18 installed in the fuel injection conduit. Also shown in FIG. 12 are heating fins 19 which are an optional feature of the design which is used to transfer more heat into the inner cylinder 10 from the outer flow passage during the exhaust process.

Figure 13:
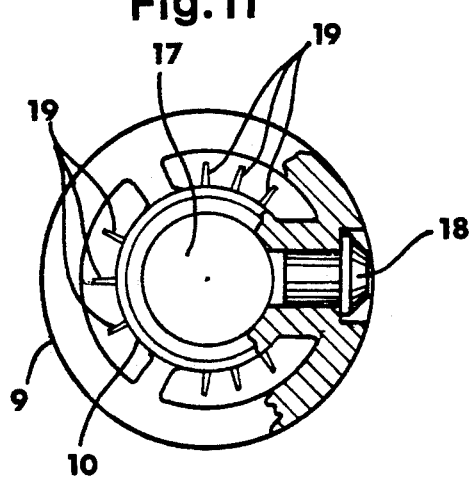
FIG. 13 is a top view of the injection cup shown partially in section to show the electrical heater in place and the placement of heating fins on the inner cylinder.

FIG. 13 is a top view of injector cup 17, a portion of which is presented in cross-section to show the installation of the electrical heater tube 18. Also shown in this view are nine heater fins 19 arranged around the outer surface of inner cylinder 10.

Figure 14:
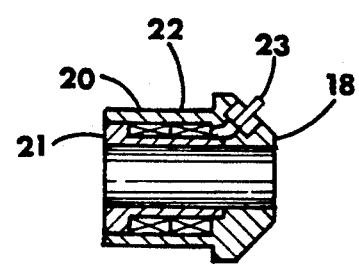
FIG. 14 is a cross-sectional view of the electrical heater taken longitudinally through the central axis.

FIG. 14 is an enlarged cross-sectional view of the heater tube 18 showing the manner of its construction which comprises an outer shell 20, an inner shell 21, an electrical heater element 22 positioned between the two shells with an insulated electrical contact 23. The heater tube 18 is electrically connected in series with a timer switch or with a thermal relay switch which breaks the electrical circuit after the engine is started and the exhaust gases have sufficiently heated injection cup 17 to cause the injected fluid to be vaporized.

Figure 15:
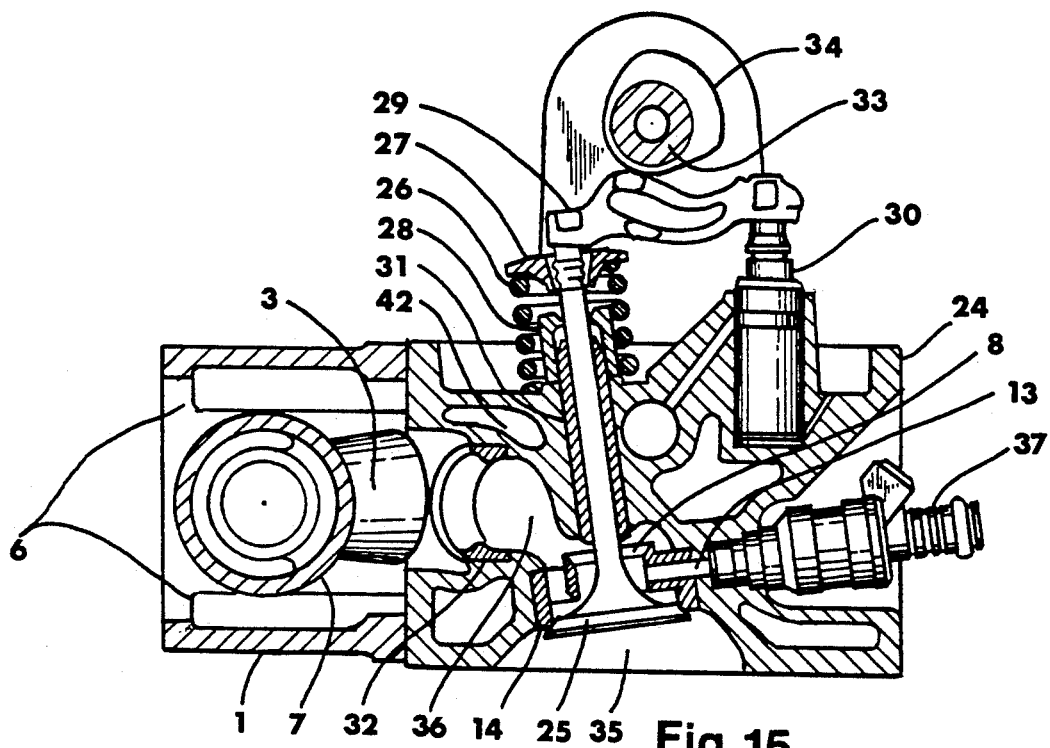
FIG. 15 is the vertical cross-section of the manifold of FIG. 8 shown mounted on a vertical cross-section of the engine cylinder head and also showing the vertical cross-section of the fuel injection cup of FIG. 10.

Referring now to FIG. 15 which is a cross-section of an engine cylinder head 24 assembly comprising a popper valve 25, valve spring 26, spring retainer 27, oil seal 28, rocker arm 29 and hydraulic adjuster 30. Press fit into the cylinder head 24 as inserts are, the valve guide 31, nozzle 32, and the injection cup 8. The method of forming and installing these latter components as press fit inserts is the preferred means but other methods may be just as applicable and as efficient. Mounted at the side of cylinder head 24 is airchest 1 as it is depicted in cross-section in the previous FIG. 8.

The cylinder head 24 and manifold assembly of FIG. 15 operates in the following manner.

During the engine piston exhaust stroke, the camshaft 33 holding the combined-lobe cam 34 rotates clockwise pushing down upon rocker arm 29 which in turn pushes poppet valve 25 off of seat 14 allowing combustion gas to pass from combustion chamber 35 through both the inner passage way within inner cylinder 10 and the outer passage way between the outer cylinder 9 and inner cylinder 10, from whence it passes into port channel 36 and then through nozzle 32 which directs the flow into the inlet of diffuser 3 where it is compressed and conducted into the exhaust pipe 7 and subsequently carried away from the engine. At this point in the engine cycle the combined-lobe cam 34 has held poppet valve 25 in the fully open position for about 52° to 55° of camshaft 33 rotation, which corresponds to about 104° to 110° of engine crank rotation. During this period exhaust gases having temperatures ranging from 1000° F. to 1700° F., depending on the fuel to air ratio of the charge, and upon the reaction rate and combustion efficiency, pass through the passage ways of the injection cup 8. The high temperature of the exhaust gas raises the temperature of inner cylinder 10 of injection cup 8 to some steady-state value corresponding to its equilibrium heat transfer rate relative to a given engine speed and load. There is no satisfactory method of throttling air in the normally aspirated univalve engine. Therefore engine speed control is governed largely by the rate of fuel injection, which means the engine may operate over a wide range of mixture ratios, with attendant high temperatures experienced in the lean range which can damage engine components and produce higher concentrations of nitrogen oxide pollutants. To reduce the combustion gas temperature during lean operation a mixture of water and alcohol or emulsified hydrocarbon are indirectly injected into the combustion chamber during the induction of intake air through injection cup 8 in which the inner cylinder 10 temperature is maintained at about 400° F. to 700° F. by the evaporative cooling of the injected mixture of water and alcohol or emulsified hydrocarbon through fuel conduit 13 into the inner passageway of inner cylinder 10 and the convective cooling of the air charge during the engine piston intake stroke.

The intake stroke of the engine is accomplished in the following manner.

Still referring to FIG. 15 and at the point of the discussion where the combined-lobe cam 34 holds the poppet valve fully open. Air has been continuously pulled through air inlets 6 of the manifold and has been entrained by the exhaust stream by impact and ejected through diffuser 3 into exhaust pipe 7 during the exhaust stroke. Air stream inertia at the end of the exhaust stroke has purged the remaining residual exhaust through diffuser 3 and air now surrounds the inlet of nozzle 32 as the engine piston intake stroke begins. The intake air convectively cools the surfaces of the poppet valve 25, injection cup 8 and port channel 36. The system is also cooled by the engine coolant flowing in the surrounding engine coolant jacket 42. After the engine piston stroke has progressed about 45° of crank rotation fuel injector 37 sprays the water alcohol solution or emulsified hydrocarbon through fuel conduit 13 into injection cup 8 where it comes into contact with the heated surfaces of injection cup 8 and poppet valve 25 and is vaporized and carried into the engine combustion chamber 35 by the air stream. During this period the camshaft has rotated 52° to 55° in which the combined lobe cam has held the valve fully open. When the engine piston has reached its bottom-dead-center position of crank rotation poppet valve 25 closes and the engine piston compression stroke begins.

Figure 16:
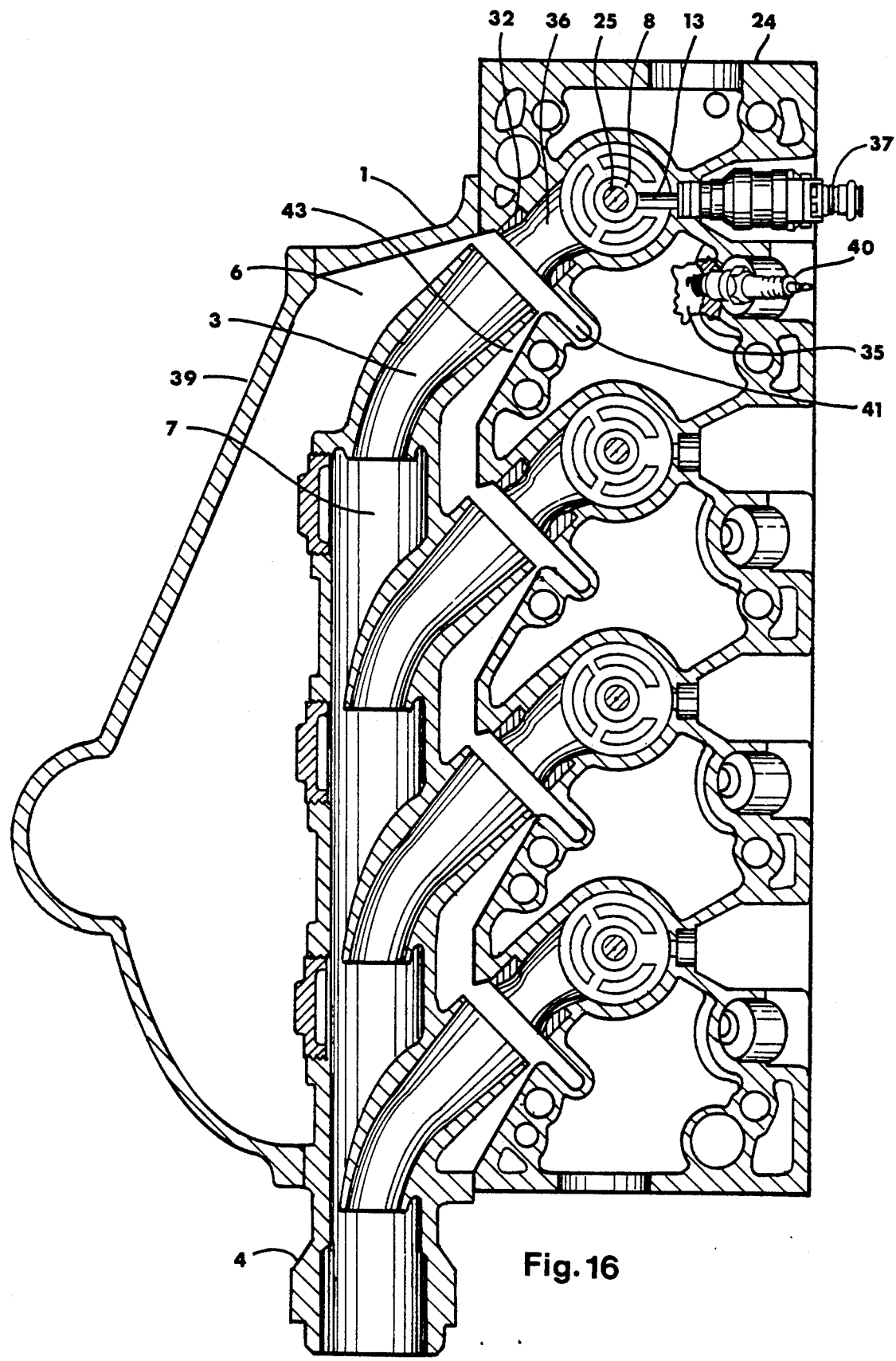
FIG. 16 is a horizontal cross-sectional view of the cylinder head and combined intake and exhaust manifold shown in FIG. 15 taken longitudinally across the entire head and manifold at a point immediately above the fuel injection conduit.

Turning now to FIG. 16 which is a horizontal cross-section of the engine cylinder head and manifold assembly of FIG. 15 taken longitudinally across the entire length of the four cylinder inline engine at a point immediately above injection cup 8. Also shown as part of the assembly is air plenum 39 attached to airchest 1. The assembly is shown in its entirety in order to describe the coordination of pumping action of the diffuser 3 exits within exhaust pipe 7. Because the elements comprising each engine cylinder flow circuit are identical and perform the same function only the flow elements of engine cylinder number one are numbered and are shown with injector 37 and spark plug 40 installed. The system shown in FIG. 16 operates in the following manner.

At the beginning of the exhaust stroke poppet valve 25, in which only the cross-section of the stem is visible in this view, opens allowing the pressurized exhaust gas from combustion chamber 35 to flow through the passage ways of injection cup 8 into port channel 36 leading to nozzle 32. The exhaust gases exit nozzle 32 at sonic velocity and impact air molecules in front of diffuser 3 inlet. The net momentum exchange between the exhaust gas molecules and air molecules carries the mixture into diffuser 3 where its velocity decreases and its pressure increases at diffuser 3 outlet causing it to flow into exhaust pipe 7 where it expands to a lower pressure. The expanded exhaust gas and air mixture flows toward exhaust flange 4 drafting past each of the downstream diffuser 3 exits pulling air through each drafted diffuser by the ejector pumping action assuring that air will be in front of each of the diffuser 3 inlets ready for reverse flow and induction into the engine through the corresponding nozzle 32 on the subsequent intake stroke of the engine piston.

The exhaust flow of the front engine cylinder number one through diffuser 3 drafts and ejects air from downstream diffusers 3 from engine cylinders two, three, and four, but is not drafted itself since it is upstream of the others. Air flow through diffuser 3 of engine cylinder one is however maintained by aspiration of the upstream volumes in exhaust pipe 7 during the exhaust cycle of engine cylinders two, three and four. Therefore, the novel feature of the present invention is seen to be in the alignment of diffuser 3 exits within exhaust pipe 7 causing it to act as a multistage ejector system which exerts a powerful pumping action along its entire length drawing air into each diffuser 3. The continuous flow of air through each diffuser 3 assures that air will be present in front of each nozzle 32 ready for induction into the engine on a subsequent induction stroke.

There are other features of the manifold flow circuit of FIG. 16 which assist in maintaining air flow through the diffusers 3 and thereby prevent exhaust gas reversion and dilution of the air charge. Diffuser 3 inlets protrude into cylinder head 24 creating an outer flow channel between the surface of the cylinder head 24 and the outer surface of the diffuser 3. This outer flow channel narrows at the diffuser 3 inlet producing a diffuser action in the outer flow channel which is pressurized at the forward flow annulus 43 when the diffuser 3 is exhausting. Air passing through the annulus 43 flows in the opposite direction of the exhaust flow from nozzle 32 and impacts with it, the net momentum exchange between the two streams as previously stated carries the mixture into diffuser 3.

The entrainment of air at the exit edge of nozzle 32 when it is exhausting results in a lower pressure in resonance chamber 41 formed in cylinder head 24. At the end of the exhaust stroke the combined-lobe cam 34 holds poppet valve 25 open and the intake stroke begins. Flow reversal now takes place within nozzle 32 as air is inducted into the engine cylinder. The low pressure generated in the resonance chamber 41 helps to maintain the velocity of air flow in the air annulus 43 during the period of flow reversal in nozzle 32 facilitating the change of the engine cycle between exhaust and intake stroke when poppet valve 25 is fully open.

Figure 17:
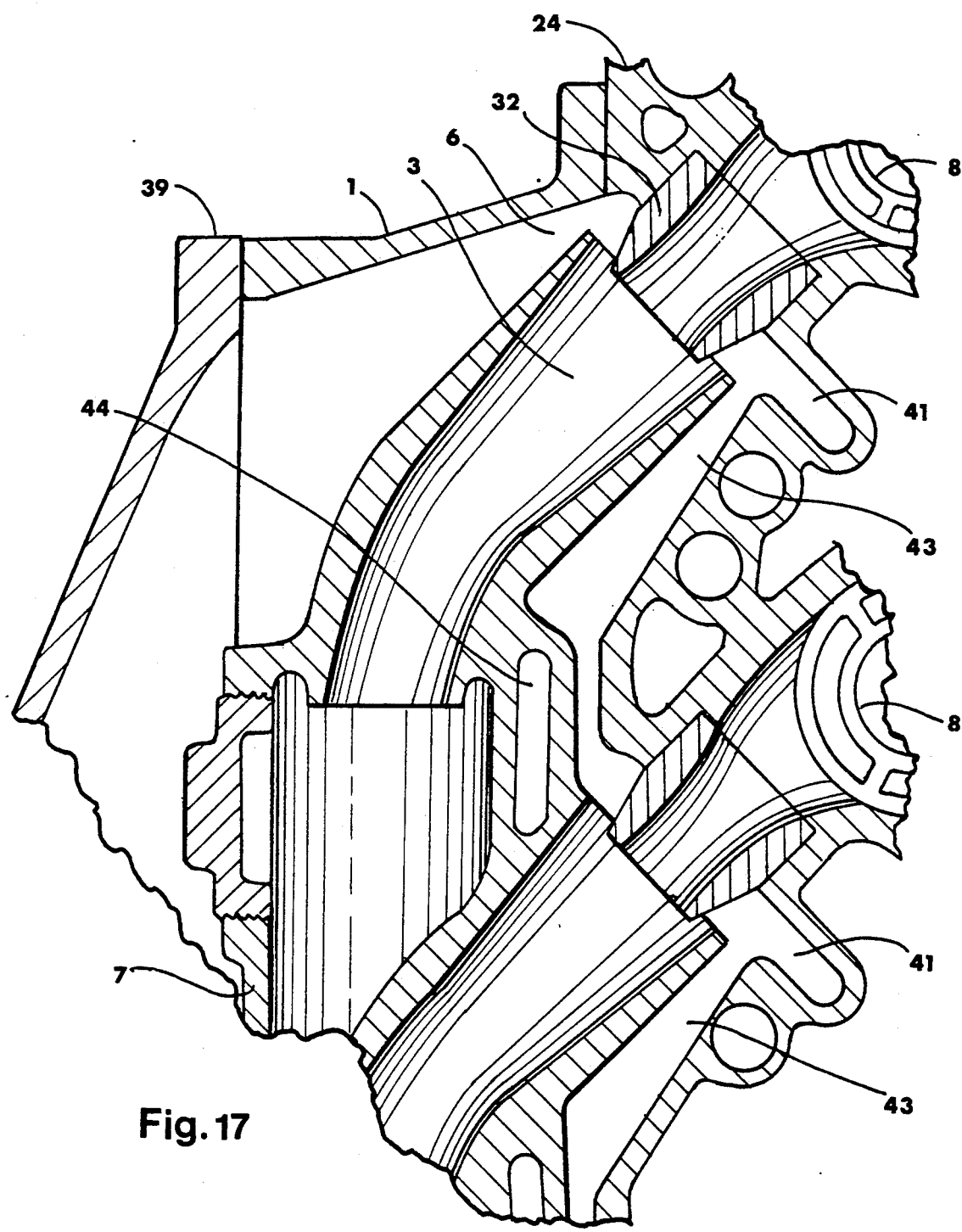
FIG. 17 is an enlarged view of a portion of a horizontal cross-section of the engine cylinder head and combined intake and exhaust manifold showing the elongated nozzle and exhaust pipe water cooling jacket modifications.

Turning now to FIG. 17 which shows a modification of nozzle 32 which is necessary when the engine is super charged, and also a variation in the method of cooling exhaust pipe 7 by the placement of a water jacket 44 around the exhaust pipe 7.

The coolant water within the water jacket 44 is circulated such that it maintains the temperature of exhaust pipe 7 at a set value lower than the exhaust gases flowing within the exhaust pipe 7 causing them to contract. The contraction of the exhaust gases lowers the pressure at the exits of diffuser 3 thereby increasing the differential pressure between the inlet and exit of diffuser 3 thus helping to maintain the flow of air through diffuser 3.

Figure 18:
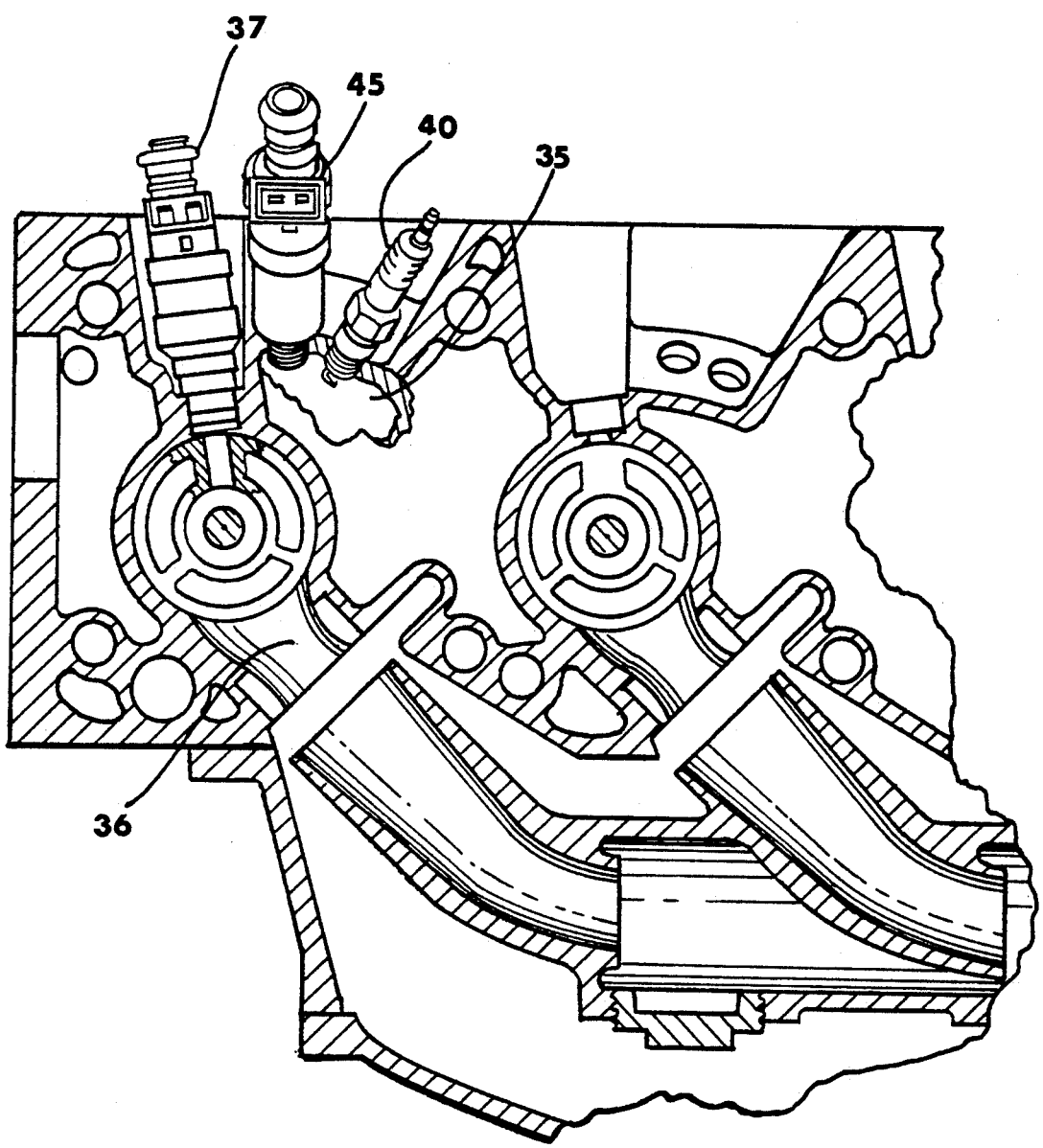
FIG. 18 is a horizontal cross-section of the forward end of the engine cylinder head and combined intake and exhaust manifold showing both the direct and indirect methods of injection used simultaneously during the engine operation.

Turning now to FIG. 18 which is similar to the cross-sectional view of cylinder head 24 shown in previous FIG. 16 but which now includes the additional facility for directly injecting fuel into combustion chamber 35 through pressure injector 45. Indirect injector 37 is also shown in FIG. 18. Injector 37 injects controlled water mixtures into injection cup 8 in a sufficient quantity necessary to maintain the combustion gas temperatures within a set range corresponding to the mixture ratio range of the directly injected fuel into combustion chamber 35 by pressure injector 45. The corresponding injection rates between indirect injection by injector 37 and direct injection by pressure injector 45 is controlled by the engines electronic control module which monitor the gas temperature flowing in port channel 36.

In other designs only direct injection is used where combustion temperatures and emissions can be controlled by other means.

The ability to control the engine speed by throttling air to airchest 1 depends almost entirely upon the efficiency of the pumping action of exhaust pipe 7 which operates as a multistage ejector system as previously described. The pumping action created by the alignment of diffuser 3 exits within exhaust pipe 7 maintains a positive differential pressure across the diffusers 3 such that the direction of flow through the diffusers 3 and through exhaust pipe 7 is always in the direction of exhaust flange 4, thus preventing exhaust gas reversion and subsequent dilution of the fresh air charge to the engine. However, the practical range of throttling air to the engine is limited by the lower pumping efficiency of exhaust pipe 7 in the low engine speed range. This deficiency is eliminated in the present invention by introducing air to both airchest 1 and exhaust manifold 7. The means of doing this is shown in FIG. 19.

Referring now to FIG. 19 which is the cross-section of the manifold shown in previous FIG. 6 which now has the additional facility to receive air within exhaust pipe 7 as well as airchest 1.

In FIG. 19 the forward end of exhaust pipe 7 has been extended past the diffuser 3 and passes through the wall of the forward end of airchest 1 and forms the extension 46 which is in communication with the internal volume of exhaust pipe 7 at one end and holds flange 48 at its other end. Airchest 1, diffusers 3, exhaust flange 4, exhaust pipe 7, extension 46, flange 48 and cooling fins 59, are formed as a single casting. Flange 48 is bolted to flange 49 of the exhaust duct 50 of throttle body 47. Throttle body 47 operates as a three-way valve and also opens into air duct 55 which holds flange 54. Flange 54 bolts to flange 53 of inlet duct 52 of air plenum 51. Pivotally mounted in throttle body 47 on shaft 57 is butterfly gate 56. The rotation of shaft 57, is electronically controlled to proportionately distribute the amount of air from throttle body inlet 58 to exhaust pipe 7 or to air plenum 51 in accordance with the engine speed and load as determined by the engine control module.

Also shown in FIG. 19 are cooling fins 59 fixedly mounted upon exhaust pipe 7. The primary purpose of the cooling fins 59 are to convectively cool the exhaust pipe by the intake air diverted by butterfly gate 56 through air duct 55 and inlet duct 52 into air plenum 51. The convective heat transfer causes the exhaust gases in exhaust pipe 7 to contract and thus promotes the pumping action across diffuser 3 as previously described. Simultaneously the intake air diverted by butterfly gate 56 into air plenum 51 passes into airchest 1 enclosing exhaust pipe 7 and flows over the outer surfaces of exhaust pipe 7 cooling fins 59 which also serve a secondary purpose of heating the intake air which is beneficial in maintaining the water vaporized in injection cup 8 in the super heated range preventing it from condensing thereby keeping the heat sink capability of the individual droplets low and thus diminishing its quenching effect during combustion.

When the butterfly gate 56 is placed in the position shown in FIG. 19 by the rotation of shaft 57 the engine is running at medium speed and the butterfly gate 56 is dividing the air from inlet 58 between the plenum 51 and exhaust pipe 7. When the engine is running at idle butterfly gate 56 completely closes off the air to plenum 51 and directs the air into exhaust duct 50 as shown in FIG. 20. Some small amount of air, called "bleed-air", is allowed to enter plenum 51 through bleed-air passage ways provided by clearance between the throttle body 47 and butterfly gate 56 in order to maintain a minimum quantity of air flow through diffusers 3.

When the engine is running at high speed, or full load, the butterfly gate 56 closes the exhaust duct and directs the air from inlet 58 to air duct 55 as shown in FIG. 21.

What is claimed is:

1. In engine of the character described as having a single valve for controlling the air induction to said engine and the exhaust gas from said engine through a port channel leading from said valve to a nozzle, said nozzle discharging exhaust gases into a diffuser inlet during the exhaust stroke of the piston of said engine, said diffuser being fixedly attached and manifolded to an exhaust pipe holding a plurality of said diffusers attached and manifolded in the same manner, the internal flow axis of said diffusers being curved such that said axis of the outlets of said diffusers are aligned with the flow axis of the said exhaust pipe and the direction of flow in said exhaust pipe and said aligned diffuser outlets is toward the exist of said exhaust pipe, the said exhaust pipe and said diffusers being positioned within an airchest, a plenum covering the air inlets of said airchest, said air plenum having an opening to admit air into said air plenum.

2. The engine of claim 1 in which the said exhaust pipe comprises a part of its construction a water jacket for cooling the exhaust gases flowing within said exhaust pipe causing them to contract.

3. The engine of claim 1 in which the said exhaust pipe comprises as part of its construction cooling fins on the outside of said exhaust pipe which heat the air charge passing over them and cool the exhaust gases flowing within said exhaust pipe causing them to contract.

4. The engine of claim 1 including a throttle valve having a throttle body for throttling air to said air plenum and to said exhaust pipe, said throttle body comprising an air inlet, an exhaust duct having a flange, an air duct having a flange, a shaft rotatively mounted in said throttle body, said shaft holding a butterfly gate such that when said shaft is rotated it pivotally moves said butterfly gate directing the flow of air from said air inlet to said air duct and to said exhaust duct, said air plenum having an inlet duct, said inlet duct having a flange, said flange of said inlet duct fixedly attached to said flange of said air duct of said throttle body placing said air duct in communication with said air plenum, said exhaust pipe having an extension, said extension in communication with said exhaust pipe, said extension having a flange, said flange of said extension fixedly attached to said flange of said exhaust duct of said throttle body placing said exhaust duct in communication with said exhaust pipe.

5. The engine of claim 1 in which said nozzle having an outlet located within said inlet of said diffuser.

6. In engines of the character described as having a single valve for controlling the air induction to said engine and exhaust gas from said engine through the same port channel having a nozzle at its exit, an injection cup fixedly mounted in said port channel concentrically about said valve, said injection cup comprising two concentric cylinders separated by three evenly spaced arms, one of said arms having a fuel injection conduit which extends along its length, said conduit having an outlet defined by an inner wall of the innermost of said concentric cylinders and an inlet defined by an outer wall of other of said concentric cylinders, and said outermost cylinder having a valve seat at one of its ends for said valve.

7. The engine of claim 6 in which said innermost cylinder is chamfered inward at one end forming a convergency funnelling air entering the combustion chamber through the center of the innermost of said concentric cylinders, said innermost of said concentric cylinders being chamfered on its outermost surface at its other end forming a divergency to the air entering the said combustion chamber through the said annular passage way between the said innermost and outermost said concentric cylinders.

8. The engine of claim 6 in which said injection cup is electrically heated by a heater tube placed within the said fuel injection conduit, said heater tube comprising a heater element encased between an outermost shell and an innermost shell, an electrical contact for connecting said heater tube to the electrical circuit of said engine.

9. The engine of claim 6 in which a plurality of heater fins are fixedly mounted upon the outermost surface of the said innermost cylinder of said concentric cylinders.

* * * * *